United States Patent Office 3,118,831
Patented Jan. 21, 1964

3,118,831
SEPARATION OF CHELATE FORMING HEAVY METALS FROM THEIR AQUEOUS SOLUTIONS
Leo R. Morris, Midland, Mich., assignor to The Dow Chemical Company, Midland, Mich., a corporation of Delaware
No Drawing. Filed Apr. 2, 1959, Ser. No. 803,539
8 Claims. (Cl. 210—38)

This invention concerns a method for separating metal ions which form chelates from their aqueous solutions which solutions may also contain metal ions which do not form chelates.

Ion exchange resins of the type having weakly basic polyalkylamine functional groups attached to a styrene-divinylbenzene matrix are well known. They have been used as anion exchangers. They are made by reacting a halomethylated insoluble vinylaryl resin, e.g., chloromethylated crosslinked polystyrene, with a polyalkylene polyamine, e.g., diethylenetriamine. Reaction involves the primary and secondary amino groups, consequently at least about half of the primary amino groups are reacted as well as a substantial proportion of the secondary amino groups. The reaction thus gives rise to a relatively highly crosslinked product which swells to a limited extent and is slow in attaining equilibrium.

In accordance with this invention, it has now been discovered that heavy metal ions, e.g., $Ni^{++}$, $Cu^{++}$, $Pt^{++}$, $Pd^{++}$, $Ag^+$, $Cd^{++}$, and $Zn^{++}$ can be separated from their aqueous solutions and from other metal ions in such solutions, e.g., $Bi^{+++}$, $Pb^{++}$, alkali metal and alkaline earth metal ions, by reaction with an insoluble but water swellable vinylbenzyl resin having diethylenetriamine substituent groups and wherein the resin is readily water swellable and rapidly attains equilibrium, as distinguished from prior art polyalkylamine resins. Chelates are formed by reaction between the heavy metal chelate-forming ions and the amino groups of the resin so that such ions are thereby separated and removed from their aqueous solutions and from metal ions therein which do not form chelates. Because of the varying affinities of the resin chelates, it is possible to effect a measure of separation in the loading step, as shown infra. Thereafter, the aqueous solution is washed from the resin with water, preferably distilled or deionized water and at least free of undesired ions, hereafter referred to as "water," and the chelated metal ions are eluted with concentrated ammonium hydroxide or with a dilute mineral acid, advantageously 2 to 6 normal, or both seriatim. Since the diethylenetriamine substituted resins used in this invention vary in degree of affinity with respect to heavy metal ions chelated, it is possible to achieve a measure of separation of such ions on elution.

Resins found useful in the practice of this invention can be made by the procedures of U.S. patent applications S.N. 786,681, now United States Patent 3,037,944, and S.N. 786,692, now United States Patent 3,037,945, both filed January 14, 1959, and S.N. 771,205, filed November 3, 1958, now abandoned. In the procedure of S.N. 786,681, a resinous polymeric vinylbenzyl sulfonium halide, e.g., polyvinylbenzyl dimethylsulfonium chloride crosslinked with about 1 to 4 weight percent of a divinylaryl hydrocarbon, e.g. divinylbenzene (hereafter abbreviated as DVB) containing between about 0.5 to 1.2 sulfonium halide groups per aryl nucleus, is heated at about 40° to 100° C. with at least a stoichiometric equivalent of a Schiff base prepared from diethylenetriamine and an aldehyde having 1 to 3 carbon atoms. Evolved sulfide is removed and the aldehyde is hydrolyzed off to liberate primary amino groups. The reactant polymeric vinylbenzyl sulfonium halide has repeating units of the formula:

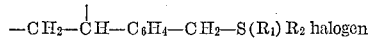

wherein $R_1$ and $R_2$ each represents a member of the group of 1 to 4 carbon alkyl groups and 2 to 4 carbon hydroxyalkyl groups, and together represent polymethylene groups and 1 to 4 carbon alkyl-substituted polymethylene groups having a total of 4 to 12 carbon atoms, and halogen is chlorine or bromine.

In U.S. patent application S.N. 786,692 similar products are obtained by a method wherein an insoluble resinous poly(halomethylstyrene) e.g. poly(chloromethylstyrene) crosslinked with about 1 to 4 weight percent of a divinylaryl hydrocarbon, e.g. divinylbenzene, containing about 0.5 to 1.2 halomethyl groups per aryl nucleus is reacted as in S.N. 786,681 with a Schiff base of diethylenetriamine as there taught and the aldehyde is similarly hydrolyzed off.

In the procedure of S.N. 771,205, a resinous polymeric vinylbenzyl sulfonium halide of the type previously disclosed is reacted with diethylenetriamine at about 100° C. to substitute diethylenetriamine groups. In all of the indicated statistical type reactions, one ends up with a resinous mixture having a preponderance of at least 65 weight percent of polymeric elements of the formula

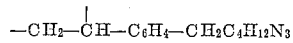

the balance being unsubstituted polymer chain units and byproducts of the intermediate structures described and combined divinylaryl hydrocarbon crosslinker in the amounts indicated. These materials act merely as diluents.

The rate of chelation of metal ions and the swelling factor when saturated with water (as defined below) indicate that these diethylenetriamine substituted resins are much less crosslinked than the products obtained by reacting a halomethylated polystyrene having an equivalent amount of divinylbenzene crosslinking or equivalent crosslinking with an equal amount of diethylenetriamine. The resins useful in the practice of this invention will usually be referred to hereafter as diethylenetriamine substituted polyvinylbenzyl chelate exchange resins or DETA resins, and will be inclusive of the theoretic prototype compound, poly(vinylbenzyl diethylenetriamine) crosslinked with about 1 to 4 percent of a divinylaryl compound and ar-hydrocarbonyl substituted homologs and analogs thereof.

The swelling factor of the resins of this invention, designated as SF, is defined as the arithmetic product of the gel water content (GWC) in weight percent in the free base (FB) form of the resin and the change in volume of the resin ($H_{H+}/V_{FB}$), acid form (actually salt form, e.g., hydrochloride) to free base form, i.e., $$SF = GWC\ (V_{H+}/V_{FB})$$

Resins meeting the requirements of the present invention have a swelling factor of at least 50. There is no upper limit to the SF. The GWC is measured on the free base form of resin particles saturated with water at room temperature. The saturated resin particles are superficially dried without loss of water from the internal gel structure, and the amount of water retained by the gel, i.e., the GWC, is determined by heating the superficially dry, water-saturated resin particles under vacuum until the resin is anhydrous. The GWC is computed as the loss of weight during drying as percent by weight of the resin saturated with water. The volume change ($V_{H+}/V_{FB}$) is measured by saturating a quantity of resin with excess 6-normal ammonium hydroxide, allowing the system to equilibrate (about 15 minutes) and washing the resin with water to a neutral effluent. The volume observed then is $V_{FB}$. The resin is then equilibrated with excess 2–6-normal mineral acid, e.g., hydrochloric acid, and washed with one bed volume of water. The volume then observed is $V_{H+}$. The volume change is the quotient $V_{H+}/V_{FB}$.

In practice, the diethylenetriamine resin is contacted with a solution containing heavy metal ions which chelate, the solution is withdrawn fractionally or in toto, as desired, from the DETA resin and the latter is washed with water. Any associated metal ions present which do not chelate are thereby removed from the resin containing chelated ions of the type indicated. If the supernatant or effluent is withdrawn fractionally a measure of separation can be obtained with metals having different affinities. These are eluated, as taught above. Thus, one can recover both chelate-forming heavy metal ions from the eluate, and non-chelate forming metal ions from the effluent. It has been found that the processes of this invention are operable within a pH range of 2 to 12. It is sometimes advantageous to use a buffered system, buffers being chosen, of course, which will not precipitate desired ions.

The following examples are in illustration of specific embodiments of the invention. They set forth the best mode contemplated by the inventor for carrying out his invention, and are not in limitation thereof.

PREPARATION OF RESINS

Example 1

A slurry of 16.0 g. (0.53 mole) of para-formaldehyde in 50 ml. of water was mixed with 30.5 g. (0.3 mole) of plant grade DETA and the resultant clear solution was cooled below 40° C. Then 20.0 g. of damp chloromethylated resinous, 1 percent crosslinked polystyrene beads (0.95 chloromethyl groups per aryl nucleus, 50–100 mesh) in 100 ml. of methylene chloride as swelling agent was added to the solution which was heated and kept at reflux. After 20 hours, the resulting brown beads were filtered, washed with water and then heated to 60° C. with 6-normal HCl. After 10 mins., a second portion of 6-normal HCl replaced the first and the mixture was again heated to reflux for 2 hrs. A pale yellow resin resulted and was washed with water, ammonium hydroxide, and water to give 49.5 g. of filtered, damp resin.

Example 2

A mixture of 130 g. of damp polyvinylbenzyl dimethylsulfonium chloride resin (prepared by reacting dimethyl sulfide with the chloromethylated polystyrene of Example 1) was mixed with 50 ml. of water and 30.5 g. of commercial diethylenetriamine. After heating to reflux, dimethyl sulfide was removed with a take-off head and the temperature was raised to 60° to 80° C. for 52 hours. The DETA resin product was then washed with water, ammonium hydroxide and water to give 31.0 g. damp product.

Example 3

A sample of 130 g. of the sulfonium resin as in Example 2 was mixed with a preformed solution of 30.5 g. of diethylenetriamine and 18.5 g. of para-formaldehyde in 200 ml. of water. The mixture was then heated to reflux and dimethyl sulfide was removed; the temperature being raised to 90° C. for 18 hours. The brown solution was decanted and 200 ml. 12-normal HCl was added, the mixture being heated to reflux for 5 hours. Finally, washing with water, ammonium hydroxide and water gave 59.5 g. of a damp, shiny brown, resin product.

Example 4

A procedure similar to that of Example 1 was followed, using as reactants ca. 2.1 mole chloromethylated polystyrene beads, 2.2 mole DETA and 4 mole paraformaldehyde. The reaction medium was 1 liter of water and 1 later of methylene chloride. A quantity of 657 grams of damp resin was obtained.

Example 5

A procedure similar to that of Example 3 was followed using as reactants 0.4 mole 2 percent divinylbenzene-crosslinked polyvinylbenzyl dimethylsulfonium chloride, ca. 1 mole DETA and 2 mole para-formaldehyde. The reaction medium was 350 ml. water. A quantity of 172 g. damp resin product was obtained.

Example 6

A procedure similar to that of Example 2 was followed, using as reactants 0.8 mole polyvinylbenzyl dimethylsulfonium chloride resin and 2 mole DETA. The reaction medium was 700 ml. water. A quantity of 235 g. damp resin product was obtained.

Example 7

The procedure of Example 6 was repeated in a scale-up to give 60 pounds of damp resin product.

Example 8

A series of capacity tests was made of the seven preceding resins, and compared with capacities of 3 commercial type polyalkylamine resins prepared by reacting chloromethylated resinous polystyrene with DETA in the usual way as taught in U.S. Patent 2,591,574. The comparative resins, designated A, B, and C had 4 percent, 2 percent and 2 percent combined divinylbenzene, respectively. An excess of a solution 0.1 molar in $CuCl_2$ and in $CoCl_2$ in a 0.25 molar potassium acetate-acetic acid buffer (pH 5) was contacted with previously conditioned (to pH 5 buffer) resin for 30 minutes. Subsequent washing with water and elution with 2 to 6 normal hydrochloric acid, then polarographic analysis of the acid eluate measured the metal picked up by the resins. Results follow.

| Resin | DVB X-linking | $GWC_{FB}$ | $V_{H+}/V_{FB}$ | SF | $Cu^{++}$ capacity, mmole/g. dry resin |
|---|---|---|---|---|---|
| 1 | 1 | 67 | 1.3 | 87 | 1.7 |
| 2 | 1 | 71 | 1.4 | 100 | 1.6 |
| 3 | 1 | 71 | 1.6 | 114 | 2.4 |
| 4 | 2 | 44 | 1.28 | 56 | 0.6 |
| 5 | 2 | 51 | 1.41 | 72 | 1.4 |
| 6 | 2 | 46 | 1.28 | 59 | 1.2 |
| 7 | 2 | 44 | 1.2 | 53 | 0.8 |
| A | 4 | 39 | 1.2 | 47 | 0.4 |
| B | 2 | <40 | 1.1 | 45 | <0.3 |
| C | 2 | 34 | 1.1 | 41 | 0.2 |

Example 9

In a buret column operation, 7.46 g. of a resin prepared from a chloromethylated polystyrene by reaction with a formaldehyde-DETA mixture similar to the procedure of Example 1 was equilibrated with a buffer 1 molar in ammonia and in ammonium chloride. An aqueous solution 0.3 molar in cupric chloride and 0.057 molar in nickel chloride in the same buffer was passed through the column at a flow rate of about 8 seconds per drop. Analyses of the effluent indicated a concentration of $Ni^{++}$ in the effluent. After saturation, acid elution with 2-normal hydrochloric acid indicated 0.66 mmole $Ni^{++}$ and 7.2 mmole of $Cu^{++}$ picked up by the resin. Thus a 2:1 preference for $Cu^{++}/Ni^{++}$ under operating conditions was indicated.

Example 10

In a column operation, 14.5 g. of the resin of Example 7 (dry basis) was equilibrated with an ammoniacal solution 2 molar in ammonium sulfate to a background pH of about 12. A quantity of 205 ml. of an aqueous solution containing cobaltic sulfate and nickel sulfate, 0.113 molar in $Co^{+++}$ 0.089 molar in $Ni^{++}$, and about 2 molar in ammonium sulfate was fed through the so-prepared column at a flow rate of 0.02 g.p.m./ft.$^2$ The resin bed was then washed with 2 bed volumes of 0.1 molar ammonium hydroxide and eluted with 2-normal hydrochloric acid. The eluate contained 13.22 mmole of $Ni^{++}$ and no detectable cobalt. The capacity of the resin for $Ni^{++}$ was therefore 0.91 mmole per gram of dry resin.

What is claimed is:

1. A method which comprises contacting an aqueous solution of at least one ionizable heavy metal compound, the cation of which is a member of the group consisting of $Ni^{++}$, $Cu^{++}$, $Co^{++}$, $Co^{+++}$, $Pt^{++}$, $Pd^{++}$, $Ag^+$, $Cd^{++}$ and $Zn^{++}$, with a chelate exchange resin insoluble but swellable therein and forming with said cation a chelate structure, the resin being a member of the group consisting of (a) the reaction product of a water insoluble, resinous, polyvinylbenzyl sulfonium halide having about 0.5 to 1.2 sulfonium halide groups per aryl nucleus and diethylenetriamine in amount at least sufficient to react with the sulfonium halide groups and (b) the reaction product of a Schiff base of diethylenetriamine and a 1 to 3 carbon aldehyde with a member of the group consisting of a water insoluble, resinous, polyvinylbenzyl sulfonium halide having about 0.5 to 1.2 sulfonium halide groups per aryl nucleus and of a water insoluble, resinous, halomethylated polystyrene having about 0.5 to 1.2 halomethyl groups per aryl nucleus, the Schiff base being in amount at least sufficient to react with the sulfonium halide and halomethyl groups, from which the aldehyde has thereafter been hydrolyzed to liberate primary amino groups the resin having a swelling factor of at least 50, the swelling factor being defined as the arithmetic product in the equation $SF = GWC\ (V_{H+}/V_{FB})$, wherein GWC represents the gel water content of the resin in free base form in percent by weight of water in the resin saturated with water at room temperature, and wherein $V_{H+}/V_{FB}$ represents the ratio of the volume of the acid form of the resin saturated with water to the volume of the free base form of the resin saturated with water at room temperature whereby the heavy metal cation forms a chelate with the chelate exchange resin, and separating the remainder of the aqueous solution from the chelate exchange resin.

2. The method of claim 1, wherein the contacting aqueous solution contains ions of at least two heavy metals which form a chelate structure, one of which has a greater affinity for the chelating groups of the resin than the other.

3. The method of claim 1, wherein the contacting aqueous solution contains ions of at least one heavy metal which forms a chelate structure and ions of at least one metal which does not form a chelate structure with the chelating groups of the resin.

4. The method of claim 1, wherein the chelated ions are eluted and recovered from the chelate exchange resin.

5. The method of claim 1, wherein non-chelate forming metal ions are recovered in the residuum of the contacting aqueous solution.

6. A method for separating $Cu^{++}$ and $Co^{++}$ from aqueous solution by contacting an aqueous solution containing $Cu^{++}$ and $Co^{++}$ with a chelate exchange resin insoluble but swellable in said aqueous solution and forming with said cations a chelate structure, the resin being a member of the group consisting of (a) the reaction product of a water-insoluble, resinous, polyvinylbenzyl sulfonium halide having about 0.5 to 1.2 sulfonium halide groups per aryl nucleus and diethylenetriamine in amount at least sufficient to react with the sulfonium halide groups and (b) the reaction product of a Schiff base of diethylenetriamine and a 1 to 3 carbon aldehyde with a member of the group consisting of a water-insoluble, resinous, polyvinylbenzyl sulfonium halide having about 0.5 to 1.2 sulfonium halide groups per aryl nucleus and of a water-insoluble, resinous, halomethylated polystyrene having about 0.5 to 1.2 halomethyl groups per aryl nucleus, the Schiff base being in amount at least sufficient to react with the sulfonium halide and halomethyl groups, from which the aldehyde has thereafter been hydrolyzed to liberate primary amino groups, the resin having a swelling factor of at least 50, the swelling factor being defined as the arithmetic product in the equation $$SF = GWC\ (V_{H+}/V_{FB})$$

wherein GWC represents the gel water content of the resin in free base form in percent by weight of water in the resin saturated with water at room temperature, and wherein $V_{H+}/V_{FB}$ represents the ratio of the volume of the acid form of the resin saturated with water to the volume of the free base form of the resin saturated with water at room temperature whereby the heavy metal cations form chelates with the chelate exchange resin, separating the remainder of the aqueous solution from the chelate exchange resin, and separating said chelated cations by elution from the chelate exchange resin.

7. A method for separating $Cu^{++}$ and $Ni^{++}$ from aqueous solution by contacting an aqueous solution containing $Cu^{++}$ and $Ni^{++}$ with a chelate exchange resin insoluble but swellable in said aqueous solution and forming with said cations a chelate structure, the resin being a member of the group consisting of (a) the reaction product of a water-insoluble, resinous, polyvinylbenzyl sulfonium halide having about 0.5 to 1.2 sulfonium halide groups per aryl nucleus and diethylenetriamine in amount at least sufficient to react with the sulfonium halide groups and (b) the reaction product of a Schiff base of diethylenetriamine and a 1 to 3 carbon aldehyde with a member of the group consisting of a water-insoluble, resinous, polyvinylbenzyl sulfonium halide having about 0.5 to 1.2 sulfonium halide groups per aryl nucleus and of a water-insoluble, resinous, halomethylated polystyrene having about 0.5 to 1.2 halomethyl groups per aryl nucleus, the Schiff base being in amount at least sufficient to react with the sulfonium halide and halomethyl groups, from which the aldehyde has thereafter been hydrolyzed to liberate primary amino groups, the resin having a swelling factor of at least 50, the swelling factor being defined as the arithmetic product in the equation $$SF = GWC\ (V_{H+}/V_{FB})$$

wherein GWC represents the gel water content of the resin in free base form in percent by weight of water in the resin saturated with water at room temperature, and wherein $V_{H+}/V_{FB}$ represents the ratio of the volume of the acid form of the resin saturated with water to the volume of the free base form of the resin saturated with water at room temperature whereby the heavy metal cations form chelates with the chelate exchange resin, separating the remainder of the aqueous solution from the chelate exchange resin, and separating said chelated cations by elution from the chelate exchange resin.

8. A method for separating $Co^{+++}$ and $Ni^{++}$ from aqueous solution by contacting an aqueous solution containing $Co^{+++}$ and $Ni^{++}$ with a chelate exchange resin insoluble but swellable in said aqueous solution and forming with said cations a chelate structure, the resin being a member of the group consisting of (a) the reaction product of a water-insoluble, resinous, polyvinylbenzyl sulfonium halide having about 0.5 to 1.2 sulfonium halide groups per aryl nucleus and diethylenetriamine in amount at least sufficient to react with the sulfonium halide groups and (b) the reaction product of a Schiff base of diethylentriamine and a 1 to 3 carbon aldehyde with a member of the group consisting of a water-insoluble, resinous, polyvinylbenzyl sulfonium halide having about 0.5 to 1.2 sulfonium halide groups per aryl nucleus and of a water-insoluble, resinous, halomethylated polystyrene having about 0.5 to 1.2 halomethyl groups per aryl nucleus, the Schiff base being in amount at least sufficient to react with the sulfonium halide and halomethyl groups, from which the aldehyde has thereafter been hydrolyzed to liberate primary amino groups, the resin having a swelling factor of at least 50, the swelling factor being defined as the arithmetic product in the equation $$SF = GWC\ (V_{H+}/V_{FB})$$

wherein GWC represents the gel water content of the resin in free base form in percent by weight of water in the resin saturated with water at room temperature, and wherein $V_{H+}/V_{FB}$ represents the ratio of the volume of the acid form of the resin saturated with water to the volume of the free base form of the resin saturated with water at room temperature whereby the heavy metal cations form chelates with the chelate exchange resin, separating the remainder of the aqueous solution from the chelate exchange resin, and separating said chelated cations by elution from the chelate exchange resin.

References Cited in the file of this patent

UNITED STATES PATENTS

| | | |
|---|---|---|
| 2,840,533 | Hwa | June 24, 1958 |
| 2,862,894 | Hwa | Dec. 2, 1958 |
| 2,888,441 | Morris | May 26, 1959 |
| 2,980,607 | Mock et al. | Apr. 18, 1961 |
| 3,037,945 | Morris et al. | June 5, 1962 |

OTHER REFERENCES

Nachod et al.: "Ion Exchange Technology," Academic Press (1956), page 412.